US 12,510,346 B2

(12) United States Patent
Ould et al.

(10) Patent No.: US 12,510,346 B2
(45) Date of Patent: Dec. 30, 2025

(54) MEASUREMENT METHOD

(71) Applicant: RENISHAW PLC, Wotton-under-Edge (GB)

(72) Inventors: John Charles Ould, Backwell (GB); Rose Crossland, Bristol (GB)

(73) Assignee: RENISHAW PLC, Wotton-Under-Edge (GB)

( * ) Notice: Subject to any disclaimer, the term of this patent is extended or adjusted under 35 U.S.C. 154(b) by 240 days.

(21) Appl. No.: 17/792,182

(22) PCT Filed: Feb. 23, 2021

(86) PCT No.: PCT/GB2021/050445
§ 371 (c)(1),
(2) Date: Jul. 12, 2022

(87) PCT Pub. No.: WO2021/170990
PCT Pub. Date: Sep. 2, 2021

(65) Prior Publication Data
US 2023/0050256 A1    Feb. 16, 2023

(30) Foreign Application Priority Data

Feb. 24, 2020 (GB) .................... 2002562

(51) Int. Cl.
G01B 5/20 (2006.01)
G01B 5/00 (2006.01)
G01B 21/04 (2006.01)
(52) U.S. Cl.
CPC ............. G01B 5/201 (2013.01); G01B 5/003 (2013.01); G01B 21/045 (2013.01)

(58) Field of Classification Search
CPC .............................. G01B 5/201; G01B 21/045
See application file for complete search history.

(56) References Cited

U.S. PATENT DOCUMENTS 2,880,407 A    3/1959  Comstock
4,167,066 A    9/1979  Cooper et al.
(Continued)

FOREIGN PATENT DOCUMENTS

DE    89 02 783 U1    5/1989
EP    0 258 471 B1    3/1993
(Continued)

OTHER PUBLICATIONS

Su, Peng et al., "Swing arm optical CMM: self calibration with dual probe shear test," Optical Manufacturing, vol. 8126, pp. 1-7, 2011.
(Continued)

Primary Examiner — Lee E Rodak
Assistant Examiner — Sangkyung Lee
(74) Attorney, Agent, or Firm — Oliff PLC

(57) ABSTRACT

A method of determining a form measurement for a curved feature of an artefact. The method includes a positioning apparatus relatively moving the artefact and a measurement device relative along a curved path in a first direction, to obtain a first set of data points along the surface of the curved feature, and the positioning apparatus relatively moving the artefact and the measurement device other along a curved path in a second direction, opposite to the first direction, to obtain a second set of data points along the surface of the curved feature. The method further includes using the first and second sets of data points to determine a form measurement for the artefact.

20 Claims, 5 Drawing Sheets

(56) References Cited

U.S. PATENT DOCUMENTS

| | | |
|---|---|---|
| 5,205,047 A | 4/1993 | Danielli |
| 5,414,260 A | 5/1995 | Takimoto et al. |
| 5,815,400 A | 9/1998 | Hirai et al. |
| 5,834,623 A | 11/1998 | Ignagni |
| 5,841,668 A | 11/1998 | Pahk et al. |
| 6,097,168 A * | 8/2000 | Katoh .................. B25J 9/16 318/560 |
| 6,327,788 B1 | 12/2001 | Seddon et al. |
| 6,498,653 B1 | 12/2002 | Wang |
| 6,564,466 B2 | 5/2003 | Uwai |
| 6,580,964 B2 | 6/2003 | Sutherland et al. |
| 6,850,806 B2 | 2/2005 | Yutkowitz |
| 6,859,747 B2 | 2/2005 | Yutkowitz |
| 6,909,983 B2 | 6/2005 | Sutherland |
| 6,961,628 B2 | 11/2005 | Yutkowitz |
| 7,464,481 B2 | 12/2008 | Ishikawa |
| 7,523,561 B2 | 4/2009 | McFarland |
| 7,900,367 B2 | 3/2011 | Sutherland |
| 7,953,583 B2 | 5/2011 | Ullrich et al. |
| 7,970,488 B2 | 6/2011 | Prestidge et al. |
| 8,229,694 B2 | 7/2012 | Nakagawa et al. |
| 8,756,973 B2 | 6/2014 | Wallace et al. |
| 9,086,262 B2 | 7/2015 | Pettersson et al. |
| 9,091,522 B2 | 7/2015 | Nakagawa et al. |
| 9,097,504 B2 | 8/2015 | Ishikawa et al. |
| 9,464,877 B2 | 10/2016 | Nakagawa et al. |
| 9,541,385 B2 | 1/2017 | Jonas et al. |
| 9,683,839 B2 | 6/2017 | Nakagawa et al. |
| 9,719,767 B2 | 8/2017 | Knäbel |
| 10,132,622 B2 | 11/2018 | Ould |
| 10,422,636 B2 | 9/2019 | Nakagawa et al. |
| 10,429,167 B2 | 10/2019 | Nakagawa et al. |
| 11,163,288 B2 * | 11/2021 | Marshall ............ G05B 19/4083 |
| 2002/0040611 A1 | 4/2002 | Uwai |
| 2002/0156541 A1 | 10/2002 | Yutkowitz |
| 2003/0009257 A1 | 1/2003 | Sutherland et al. |
| 2003/0033105 A1 | 2/2003 | Yutkowitz |
| 2003/0056147 A1 * | 3/2003 | Yutkowitz ............. G05B 11/28 714/25 |
| 2004/0093179 A1 | 5/2004 | Sutherland |
| 2006/0291969 A1 * | 12/2006 | Koch .............. G05B 19/40937 409/132 |
| 2007/0033819 A1 | 2/2007 | McFarland |
| 2007/0271803 A1 | 11/2007 | Ishikawa |
| 2008/0051927 A1 | 2/2008 | Prestidge et al. |
| 2008/0184579 A1 * | 8/2008 | McFarland ............ G01B 21/04 33/551 |
| 2008/0306718 A1 | 12/2008 | Mi et al. |
| 2009/0307915 A1 | 12/2009 | Sutherland |
| 2010/0011600 A1 * | 1/2010 | Hunter ................. G01B 21/04 33/503 |
| 2010/0132432 A1 | 6/2010 | Wallace et al. |
| 2010/0174504 A1 | 7/2010 | Nakagawa et al. |
| 2014/0007441 A1 | 1/2014 | Pettersson et al. |
| 2014/0059872 A1 | 3/2014 | Nakagawa et al. |
| 2014/0130362 A1 | 5/2014 | Ishikawa et al. |
| 2015/0233692 A1 | 8/2015 | Nakagawa et al. |
| 2015/0377617 A1 | 12/2015 | Ould |
| 2016/0018218 A1 | 1/2016 | Nakagawa et al. |
| 2017/0241759 A1 * | 8/2017 | Werner ................. G01B 7/008 |
| 2018/0058834 A1 | 3/2018 | Nakagawa et al. |
| 2018/0058847 A1 | 3/2018 | Nakagawa et al. |

FOREIGN PATENT DOCUMENTS

| | | |
|---|---|---|
| JP | S58-30609 A | 2/1983 |
| JP | H08-95625 A | 4/1996 |
| JP | H11-248406 A | 9/1999 |
| JP | 2000-501505 A | 2/2000 |
| JP | WO2013/024614 A1 | 3/2015 |
| JP | 2016-502080 A | 1/2016 |
| JP | 2018-31755 A | 3/2018 |
| WO | 97/21076 A1 | 6/1997 |
| WO | 02/073128 A1 | 9/2002 |
| WO | 2007/125306 A1 | 11/2007 |
| WO | 2009/010721 A1 | 1/2009 |
| WO | 2011/107746 A1 | 9/2011 |

OTHER PUBLICATIONS

Evans, Chris J. et al., "Self-Calibration: Reversal, Redundancy, Error Separation, and 'Absolute Testing'", Annals of the CIRP, vol. 45, pp. 617-634, 1996.

* cited by examiner

MEASUREMENT METHOD

This invention relates to a method for inspecting a feature of a workpiece on a positioning apparatus, in particular a method for assessing the form of a curved feature (e.g. a method of determining a circularity value for a circular feature).

It is known to measure a feature of a workpiece before, during or post-production, e.g. in order to confirm that the feature conforms to desired tolerances, and/or for determining the location and/or orientation of the feature and/or workpiece. This typically involves a measurement device (a "probe") and a workpiece being moved relative to each other via an apparatus, so that measurements of different points on the workpiece can be taken. Whilst products and techniques are available for measuring workpieces on the machine tool which were (or are to be) machined, it is still common to measure those parts of components which require very high tolerances on a dedicated coordinate measuring machine (CMM). In particular, the form of features, for example engine-block cylinders and valve seats, need to be tightly controlled, and so measurements thereof are often performed on a dedicated CMM. An example of a form measurement is the "circularity" or "roundness" of a circular feature. As will be understood, and as defined by the well-established Geometric Dimensioning and Tolerancing (GD&T) system, form measurement is a particular measurement which is distinct from position or size (e.g. diameter) of the surface.

Due to CMMs being made primarily to measure workpieces (whereas machine tools are made primarily to machine workpieces) CMMs are traditionally able to offer higher levels of accuracy of measurement and are subject to fewer errors than machine tools. This is often because of the differences in the mechanical configuration of CMMs and machine tools. For instance, the drive mechanisms of machine tools are often very different to CMMs because the drive systems of machine tools need to be able to withstand large forces due to the machining operations they are required to undertake (unlike a CMM which only needs to carry measuring devices requiring low forces during operation).

However, there is an increasing desire to carry out more and more measurements of workpieces in situ, on the machine tool, because doing so can save a significant amount of time and cost.

However, the inventors found that it was difficult to achieve accurate form/circularity measurements of curved surfaces, particularly on a machine tool apparatus.

The present invention relates to a technique for improving the form measurement of a curved feature, such as the roundness or circularity of a circular feature, which can be of particular value when such features are to be measured on a machine tool, which often are unable to provide sufficiently accurate measurement data.

According to a first aspect of the invention there is provided a method of determining a form measurement for a curved feature of an artefact, the method comprising: i) a positioning apparatus relatively moving the artefact and a measurement device along a curved path in a first direction, to obtain a first set of data points along the surface of the curved feature; ii) the positioning apparatus relatively moving the artefact and the measurement device along a curved path in a second direction, opposite to the first direction, to obtain a second set of data points along the surface of the curved feature; and iii) using the first and second sets of data points to determine a form measurement for the artefact.

The present inventors found that errors in the measurement of a curved feature can be caused by the motion of the machine (in particular due to so-called "lost motion" of the machine). Although such measurement errors (caused by the motion of the machine) are small (e.g. in the order of a few microns), they were preventing the inventors from achieving the accurate form measurement being demanded. The inventors found that the technique of the present invention reduced the effect of the error, and enabled a more accurate/reliable form measurement to be obtained.

Using the first and second sets of data points can comprise obtaining (from the first and second sets of data points) a representation of an intermediate surface which lies between lines/surfaces represented by the first and second sets of data points. As will be understood, the representation of an intermediate surface and the lines/surfaces represented by the first and second sets of data points can be notional. For example, the representation of an intermediate surface can comprise a third set of data points (which lie on the notional intermediate surface). In other words, "using the first and second sets of data points" can comprise obtaining a third set of data points which lie on a (notional) surface equidistant between lines/surfaces represented by the first and second sets of data points. The form measurement can then be determined from the representation of the intermediate surface (e.g. from the third set of data points). As will be understood by a person skilled in the art, the representation of an intermediate surface can comprise something from which an intermediate surface can be constructed; for instance the representation of an intermediate surface can comprise a function, for example one or more splines (e.g. B-splines or a Non-Uniform Rotational Basis Spline "NURBS" surface). As will also be understood by a person skilled in the art, the representation of an intermediate surface could comprise a 2-dimensional (2D) representation, for example a 2D curve. This can be the case even if the first and second sets of data points comprise 3-dimensional (3D) data sets. As will also be understood by a person skilled in the art, the representation of an intermediate surface could comprise a 3-dimensional (3D) representation, for example a 3D curve.

The data points could be referred to as "position" data points (accordingly the first and second sets of data points could be referred to as first and second sets of position data points), because they relate to position information rather than non-position information (e.g. such as temperature information). As will be understood, the position data points could be obtained by combining position data/information about the positioning apparatus (such as the relative position of the artefact and measurement device) with data/information from the measurement device (e.g. in the case of a contact probe, stylus deflection data). As explained in more detail below, the position data/information about the positioning apparatus (e.g. about the relative position of the artefact and measurement device) could be assumed, or it could be known (e.g. via one or more position encoders on the positioning apparatus). Furthermore, as explained in more detail below, the direction of the measurement obtained by of the measurement device (e.g. the direction of stylus deflection) could be assumed, or it could be known.

The data points could be obtained by combining information about the relative position of the measuring device and artefact, with a vector from that position to the surface being measured. The relative position of the measuring device and artefact could be known (e.g. via one or more position encoders on the positioning apparatus) or could be assumed. The direction of the vector to the surface being measured could be known, or could be assumed.

It has been found that the invention is particularly beneficial when the curved feature is a curved face of the artefact (e.g. the curved faces of a cylinder or cone, rather than the ends of the cylinder/cone).

It has been found that the invention is particularly beneficial when the measurement device is being used to take measurements of the artefact in a dimension which extends substantially along the radius of curvature of the curved path at the point of measurement. Accordingly, preferably the first and second sets of data points comprise measurement data obtained/taken/measured substantially radially with respect to the curvature of the curved path at the point of measurement (e.g. at least within 45° of the radius of curvature of the curved path at the point of measurement, more preferably at least within 30° of the radius of curvature of the curved path at the point of measurement, especially preferably within 15° of the radius of curvature of the curved path at the point of measurement, for example within 10° of the radius of curvature of the curved path at the point of measurement).

The form measurement could comprise the profile tolerance of a curved feature. Optionally, the form measurement comprises the roundness tolerance or "circularity" of a circular feature. Optionally, the form measurement comprises the cylindricity tolerance of a cylinder. The form measurement could comprise a value (form value), and so, for example, the form measurement could comprise a roundness value, circularity value, or cylindricity value.

Preferably, the intermediate surface is equidistant between lines/surfaces represented by the first and second sets of data points. Determining a representation of an intermediate surface which is equidistant between lines/surfaces represented by the first and second sets of data points is understood to enable a more accurate form measurement to be determined therefrom.

The relative movement in the first and second directions can be effected, at least in part, by the motion of at least one moveable axis of the positioning apparatus which is reversed during said movement in each of the first and second directions. The moveable axis could be a linear axis. Accordingly, the relative movement in the first and second directions can be effected, at least in part, by the motion of at least one linear movement axis of the positioning apparatus. In particular, the relative movement in the first and second directions can be effected, at least in part, by the motion of at least one linear movement axis of the positioning apparatus which is reversed during said movement in each of the first and second directions. The relative movement in the first and second directions can be effected by the combined motion of at least two, non-parallel, linear movement axes of the positioning apparatus. In particular, the relative movement in the first and second directions can be effected by the combined motion of at least two, non-parallel, linear movement axes of the positioning apparatus, at least one of which is reversed during said movement in each of the first and second directions. One source of measurement error which can have a significant adverse effect on the form measurement arises due to the motion along at least one linear axis being reversed (axis reversal error), and this is a particular problem on machine tools. It has been found that this can, at least partly, be due to machine/axis backlash. For instance, when a motor reverses its direction of control/power, there can be a small delay before the axis which the motor controls actually starts to move. As will be understood, to help solve the backlash problem, the same axis/axes of motion of the positioning apparatus should be used to effect the relative motion in steps i) and ii). As will be understood, said relative movement could comprise moving the artefact and holding the measurement device still, or could comprise moving the measurement device and holding the artefact still, or could comprise moving the artefact and the measurement device at the same time.

It is commonplace for a machine tool not to have position measurement encoders for directly measuring the position of its moveable axes; instead the machine tool controller can monitor the position of its axes via encoders on the axes' drives/motors (which do not necessarily provide an accurate representation of the actual position of an axis). Even if a machine tool does have position measurement encoders for directly measuring the position of its moveable axes, such position information might not be available to the process for determining the form measurement. Indeed, machine tools are often not designed to continuously report axis position information to a separate measurement process. Accordingly, it is known in the machine tool field, for a measurement process to assume the position of the axis (e.g. based on the instructions for driving the machine tool rather than determined from encoders on the machine tool) and to combine the assumed position information with data from the probe to determine surface position information. It is also possible that the metrological information about the feature might be determined solely from the measurement device's (e.g. probe's) output (i.e. without combining it with reported or assumed axis position information). Accordingly, it is quite often the case, especially in the machine tool field, that the effect of the axis reversal backlash on the axis position will not be directly measured/known and so no matter how well calibrated, accurate, and error free the measurement device mounted on the machine tool is, errors can be introduced to the measurement data which is used to determine the form of the part due to the structure and/or configuration of the machine tool itself.

Machine manufacturers have taken steps to try to deal with the backlash issue, for example by servoing the drives to try to compensate for backlash, but such solutions can themselves introduce further measurement errors, for example "axis-reversal spikes" as they are known in the field. Whilst axis-reversal is one source of error in the form measurements, other sources/causes exist such as dynamic structural deformations caused by the acceleration of the machine. Such axis reversal and dynamical structural deformations can result in so-called "lost motion" or errors caused by un-transduced motion of the machine.

The inventors found that by using the technique of the present invention, the effect of such errors on the form measurement could be reduced, and could result in a form measurement with a level of accuracy beyond the expected capability of the machine tool.

Preferably, the relative angular orientation of the measurement device and artefact is the same for both the first and second measurements. In other words, preferably the relative angular orientation of the measurement device and artefact is unchanged between the first and second measurements. This avoids the need to consider the effect of the relative angular orientation of the measurement device and artefact on the form measurement. For example, in the case of a contact probe, if there is a probe tip offset error, then changing the relative angular orientation of the measurement device and artefact can have an effect on the form measurement. Ensuring that the relative angular orientation of the measurement device and artefact is the same for both the first and second measurements avoids the need to know/determine the probe tip offset error.

The positioning apparatus could be a dedicated measuring apparatus, such as a coordinate measuring machine (CMM). The positioning apparatus can comprise a machine tool. In particular, the positioning apparatus can comprise a machine tool on which the artefact was previously machined, or on which the artefact is to be machined.

The curved feature can comprise an arc-shaped feature. The curved feature can comprise a circular feature. For example, the curved feature can comprise a cylindrical boss or bore. Accordingly, obtaining the first and/or second sets of data points can comprise the positioning apparatus moving the artefact and the measurement device relative to each other along a circular path, for instance along a partial or fully-circular path. The measurement of the curved feature could be constrained to a plane, but this need not necessarily be the case. For example, the positioning apparatus could move the artefact and measurement device relative to each other along a helical or spiral path.

Relative motion of the artefact and measurement device could comprise motion of the artefact whilst the measurement device is held stationary, or vice versa. Relative motion of the artefact and measurement device could also comprise motion of both the measurement device and artefact.

Preferably, the first and second sets of data points are obtained along substantially the same target scan line (or "nominal measurement line") on the surface of the curved feature.

The curved path along which the artefact and measurement device are moved relative to each other to obtain the sets of data points can be predefined/predetermined.

As mentioned above, especially when looking to solve the backlash problem, the same axis/axes of motion of the positioning apparatus should be used to effect the relative motion in steps i) and ii).

The curved paths for steps i) and ii) need not necessarily be the same. For example, the curved paths of step i) and ii) could be configured such that the same target scan line (or "nominal measurement line") is measured on the surface of the curved feature, but in a different location within the positioning apparatus' operating volume. However, preferably the curved path along which the artefact and measurement device are moved relative to each other to obtain the second set of data points is the same as the curved path along which the artefact and measurement device are moved relative to each other to obtain the first set of data points. Preferably, the first and second sets of data points can be obtained by the positioning apparatus moving the artefact and measuring device relative to each other along the same curved path, but in which the different data sets are obtained by motion along the same curved path in different directions. Accordingly, it can be preferred that the curved paths of i) and ii) are the same such that the first and second sets of data points are obtained along the same target scan line (or "nominal measurement line") on the surface of the curved feature for steps i) and ii), the position of the target scan line within the positioning apparatus's operating volume is the same for steps i) and ii), and the shape/form of the curved path along which the artefact and measuring device are relatively moved will be the same.

Making the curved paths of i) and ii) the same, can help to prevent any differences in the performance (e.g. magnitude of backlash) of the positioning apparatus which are location dependent from affecting the first and second sets of data points obtained by the positioning apparatus. This can also help to ensure that, in the case of a contact probe, nominally the same probing force is used during the obtaining of the first and second sets of data points.

Further still, it can be preferable that the rotational position/orientation of the artefact with respect to the positioning apparatus, and/or of the measuring device with respect to the artefact, does not change between steps i) and ii). Accordingly, in other words, it can be preferred that the physical arrangement and configuration of the artefact and measurement device is kept substantially the same for steps i) and ii).

Further still, it can be preferable that the speed at which the measuring device and artefact are moved relative to each other along the curved paths in steps i) and ii) is substantially the same.

Accordingly, it can be preferable that every aspect of steps i) and ii) is substantially the same, except for the direction along which the measuring device and artefact are moved relative to each other along the curved path.

The measurement device can comprise a contact or a non-contact measurement device. As is commonly the case in the field of measurement apparatus, the measurement device could also be referred to as a probe. Measurement devices (or "probes") suitable for use with the present invention include what are commonly referred to as scanning probes (also referred to as "analogue probes"). Scanning probes (or "analogue probes") are probes which can be scanned along/relative to a surface whilst continuously interacting with the surface (e.g. in the case of a contact probe, whilst continuously contacting the surface) so as to obtain a series/set of measurement points along the surface. This is in contrast to touch-trigger probes which require the probe to be advanced toward and retracted from the surface for each data point to be measured.

Scanning probes can provide one or more output signals which vary (i.e. in a non-binary manner, in other words, over a range) dependent on the relative degree of interaction of the probe and surface. The signal(s) of a scanning probe can thereby enable the relative position of the probe body and the surface to be continuously determined as the probe is scanned along/relative to the surface.

A contact scanning probe typically comprises a body which is mounted/mountable on the positioning apparatus, and a stylus which extends from the body. Typically, a contact tip (e.g. a "stylus ball") is provided at the free end of the stylus for contacting an artefact. Contact scanning probes are configured to output one or more signals which vary depending on the amount by which the stylus has deflected from its rest position (and optionally which varies depending on the direction of stylus deflection), such that the extent (and optionally direction) of the stylus deflection is known. This is in contrast to so-called "touch-trigger probes", which are configured to output a trigger signal when the stylus has defected from a rest position by a threshold amount.

Accordingly, the method could comprise a positioning apparatus relatively moving the artefact and measurement device along a curved path (in the first and then second directions) so as to continuously scan the measurement device along/relative to the surface of the curved feature (and thereby obtain the first and then second sets of data points along the surface of the curved feature). Accordingly, in the case of a contact scanning probe, the first and second sets of data points can be obtained by moving the contact scanning probe whilst the contact scanning probe is in continuous contact with the surface of the curved feature.

Accordingly, this document describes a method of determining a form measurement for a curved feature of a workpiece, using measurement data obtained by a measurement device mounted on a positioning apparatus comprising a plurality of linear axes, in which the process of collecting measurement data by the measurement device involves relative movement of the measurement device and the workpiece along a predefined curved path effected by the motion of at least one linear axis of the positioning apparatus which is reversed during the relative movement of the measurement device and the workpiece along the predefined curved path, the method comprising: the positioning apparatus moving the artefact and the measurement device relative to each other along the predefined curved path in a first direction and obtaining a first set of measurement data; the positioning apparatus moving the artefact and the measurement device relative to each other along the same predefined curved path in a second direction, opposite to the first direction, and obtaining a second set of measurement data; determining a form measurement for the curved feature from the first and second sets of measurement data.

As will be understood, the above described method can be computer implemented. Accordingly, any or all of the above described steps of the method can be performed under the control of a computer/processor/processing device, such as, for example, a computer controller, numerical controller (NC), for instance a computer numerical controller (CNC), or the like. Suitable processing devices include, but are not limited to, CPUs (Central Processor Unit), FPGAs (Field Programmable Gate Array), ASICs (Application Specific Integrated Circuit), or the like. As will be understood, steps i), ii) and/or iii) could be performed under the control of different computer/processor/processing devices. In particular, for example, step iii) could be performed under the control of a computer/processor/processing device which is different to that used in steps i) and ii). For instance, step iii) could be performed by a computer/processor/processing device which is different to, and for instance physically remote from, the computer/processor/processing device used in step i) and ii), and/or can be performed at a substantially different time to steps i) and ii).

This document also describes an apparatus configured to perform the above described method(s). For instance, there is described herein an apparatus comprising a positioning apparatus (such as a machine tool) on which a measurement device and artefact are located, and the apparatus is configured such that the positioning apparatus relatively moves the artefact and a measurement device relative along a curved path in a first direction, to obtain a first set of data points along the surface of the curved feature. The apparatus is further configured such that the positioning apparatus relatively moves the artefact and the measurement device other along a curved path in a second direction, opposite to the first direction, to obtain a second set of data points along the surface of the curved feature. The apparatus is also configured to use the first and second sets of data points to determine a form measurement for the artefact. For example a computer/processor/processing device, such as a PC can be configured to use the first and second sets of data points to determine a form measurement for the artefact.

Accordingly, this document also describes a computer/processor/processing device (for instance a PC) comprising computer program code, which is configured to take a first set of data points which were obtained by a measurement device mounted on a positioning apparatus whilst the measurement device and the artefact were moved by the positioning apparatus relative to each other along a curved path in a first direction, and to take a second of data points which were obtained by the measurement device whilst the measurement device and the artefact were moved by the positioning apparatus relative to each other along a curved path in a second direction, and to use the first and second data sets to determine a form measurement for the artefact.

Accordingly, the application also describes computer program code (e.g. stored on a computer readable medium), which is configured to cause a processor device (e.g. a controller and/or PC) on which it is executed to take a first set of data points which were obtained by a measurement device mounted on a positioning apparatus whilst the measurement device and the artefact were moved by the positioning apparatus relative to each other along a curved path in a first direction, and to take a second of data points which were obtained by the measurement device whilst the measurement device and the artefact were moved by the positioning apparatus relative to each other along a curved path in a second direction, and to use the first and second data sets to determine a form measurement for the artefact.

Embodiments of the invention will now be described, by way of example only, with reference to the following drawings, in which:

FIG. 1 schematically illustrates an isometric view of a machine tool apparatus;

Figure 1:
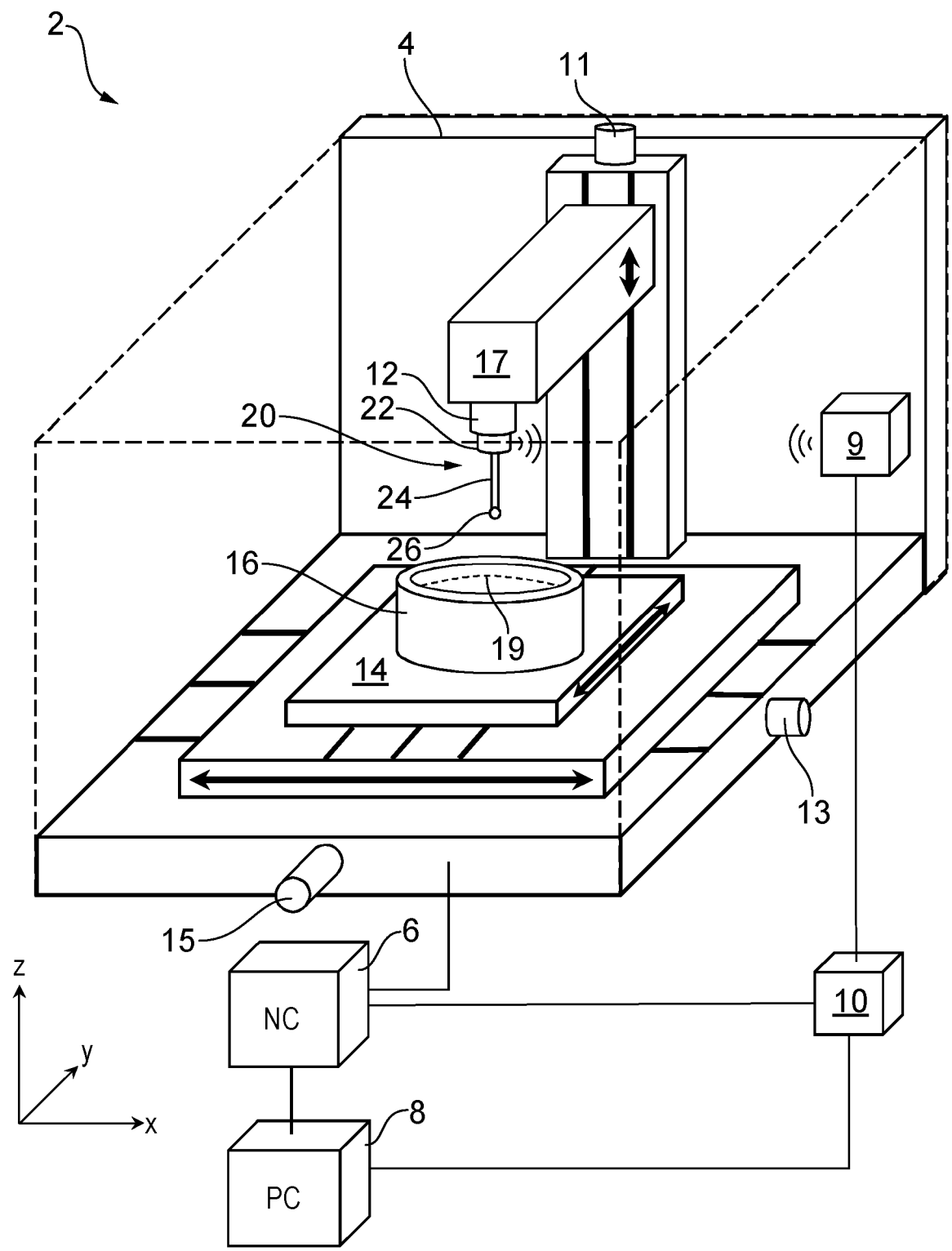

Referring to FIG. 1, there is shown a machine tool apparatus 2, comprising a machine tool 4, a numerical controller 6 (NC) (for example, a computer numerical controller or "CNC"), a PC 8, a transmitter/receiver 9 and an interface 10. The machine tool 4 comprises a spindle 12 attached to an arm 17 which is moveable in the z dimension via a motor 11 and a moveable table 14 which can move in the x and y dimensions via motors 13, 15. When being used to work (e.g. machine) a workpiece 16, the workpiece 16 is mounted on the movable table 14 and a tool (not shown) is mounted in the spindle 12. The NC 6 controls rotation of the spindle 12, z movement of the arm 17, and x/y motion of the moveable table 14 in order to bring the tool and workpiece together so as to cause the tool to work the workpiece. The NC 6 can be programmed with a machining operation, for example via the PC 8.

When being used to inspect a workpiece 16, an inspection device, such as a probe 20, is mounted in the spindle 12. Again, the NC 6 can control z movement of the arm 17 and x/y motion of the moveable table 14 to cause the probe 20 to interact with the workpiece 16 (e.g. by contacting the workpiece if the probe is a contact probe) so as to measure the workpiece 16. The NC 6 can be programmed with an inspection operation, for example via the PC 8.

Although not shown in the described embodiment, the machine tool 4 could comprise one or more axes of rotation for rotating the table 14 (e.g. about the x, y and/or z axes). Additionally/alternatively, the machine tool 4 could be configured such that the spindle 12 is rotatable about other additional axes of rotation (e.g. such that a probe mounted therein can be rotated about the x and/or y axes). Additionally/alternatively, the machine tool 4 could be configured such that the spindle 12 is moveable in the x and/or y axes and/or the table could be moveable in the z axis.

In this embodiment, the probe 20 is a contact probe, comprising a body 22 which is mounted to the spindle 12, a stylus 24 extending from the body 22 and a stylus tip 26 at the end of the stylus 24 distal to the body 22. In the described embodiment, the stylus 24 can deflect relative to the body 22 (e.g. when the stylus tip 26 touches a surface), and such deflections can be detected by sensors in the body 22. In particular, in the embodiment described, the probe 20 is a scanning probe (also known in the art as an analogue probe) in which the extent/amount/degree of the deflection of the stylus from a rest position can be sensed and reported by the probe 20 (in contrast to a touch-trigger probe which only reports when the stylus has deflected, e.g. by a predetermined threshold amount). The probe 20 can output separate values indicative of the extent of deflection of the stylus in different directions relative to the probe (e.g. a value for the extent of deflection in the x direction, a separate value for the extent of deflection in the y direction, and/or a separate value for the extent of deflection in the z direction—all measured relative to the probe) and/or could output an aggregated deflection value. Scanning probes for machine tools are known; for instance the SPRINT' probe available from Renishaw plc. As will be understood, other probes and other technologies could be used.

A feature of a workpiece to be inspected can be measured by bringing the stylus tip 26 into contact with the feature of the workpiece 16. Stylus deflection data from the probe 20 can be streamed instantaneously and continuously to the PC 8, for example via a wired connection, or as in the present example, wirelessly via the receiver 9 and interface 10. The connection between the probe 20 and the receiver 9 could be optical or radio, for example. As will be understood, other techniques could be used to transfer stylus deflection data. For example, the data could be transmitted at intervals (regular or irregular), or only when requested, for example. In other example embodiments, stylus deflection data could be stored locally within memory in the probe 20, and downloaded to the PC 8 at a later time, e.g. via a wired or wireless link.

Optionally, data from the probe 20 could be combined with machine tool position data; for example, combined with data concerning the relative position of the probe 20 and table 14 (and hence workpiece 16). For example, a process running on the PC 8 could be configured to combine data from the probe 20 with spindle 12 and table 14 position data. Such spindle 12 and table 14 position data could be assumed (e.g. based on the instructions for driving the machine tool rather than determined from encoders on the machine tool) or could be obtained from measurement devices (not shown) which monitor the position of the spindle 12 and table 14 in any or all of the x, y and z axes. Such measurement devices could be, for example, resolvers or encoders monitoring the rotary position of a part of the motors 11, 13, 15 which control the position of the spindle 12 and table 14 in the x, y and z axes. In the case where the process for determining the form of the part uses data from the measurement devices which monitor the position of the spindle 12 and table 14, then clock/synchronisation signals (for instance issued by the interface 10) can be used to help determine simultaneous spindle 12 and table 14 position data and probe data (e.g. as described in U.S. Pat. No. 7,970,488).

Accordingly, the data points could be obtained by combining information about the (known or assumed) relative position of the measuring device and artefact, with a vector from that position to the surface being measured. As mentioned above, the probe 20 can output separate values indicative of the extent of deflection of the stylus in different directions relative to the probe, e.g. a value for the extent of deflection in the x direction, a separate value for the extent of deflection in the y direction, and/or a separate value for the extent of deflection in the z direction. In such a case, the direction of a vector from the known/assumed relative position the measurement device is held with respect to the artefact, and the surface being measured can be known. As also mentioned above, the probe 20 could output an aggregated deflection value, in which case the direction of a vector from the known/assumed relative position the measurement device is held with respect to the artefact, and the surface being measured can assumed.

With the example set up of FIG. 1, if the cylindrical workpiece 16 is to be measured by the probe, the spindle 12 needs to be moved vertically (along the z-axis) and the table 14 need to be moved laterally (along the x and/or y axes) so as to bring the probe's tip 26 into contact with the surface of the cylindrical workpiece 16. The table 14 then needs to be moved along the x and y axes simultaneously (e.g. in a synchronised manner) so as to cause the workpiece 16 to move in a circle, e.g. so as to cause the probe tip 26 to scan along a target scan line (or "nominal measurement line") 19. To achieve such a circular motion, the direction of motion of the table 14 along the x and y axes will need to be reversed multiple times. Optionally the z-axis can also move at the same time to cause a spiral scan of the workpiece 16 to be obtained.

Figure 2:
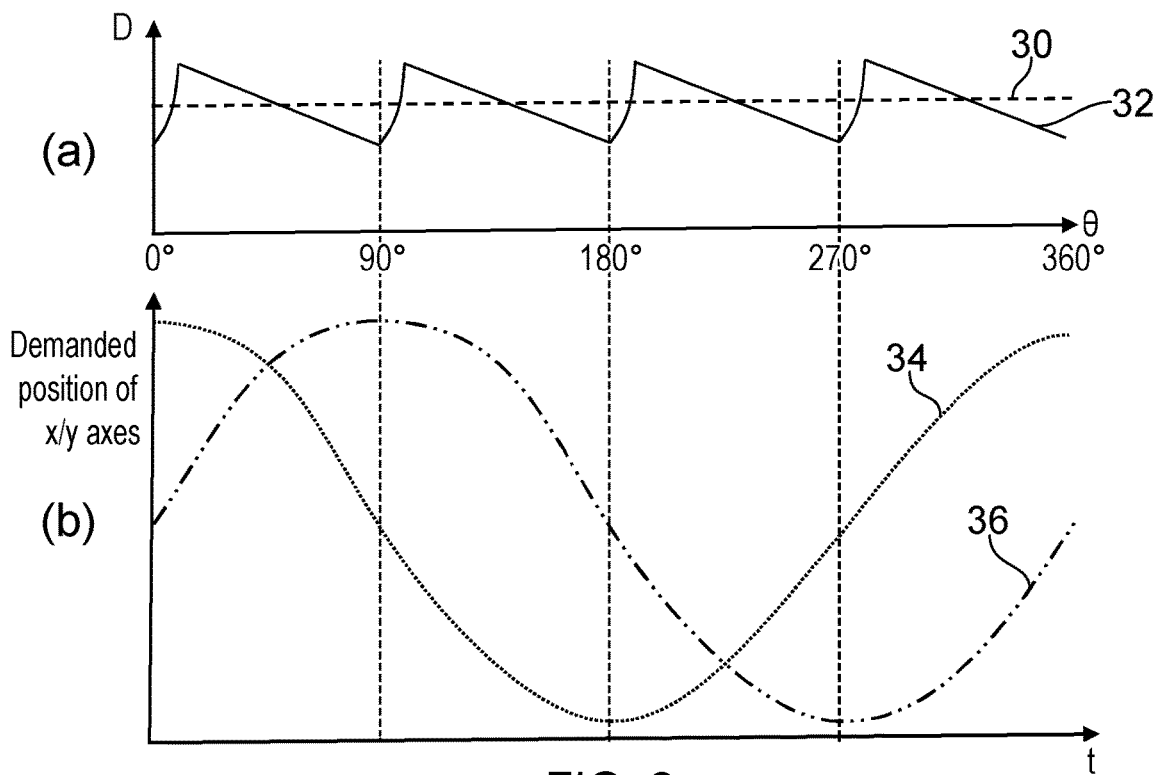
FIG. 2(a) illustrates the effect of axis reversal error on the expected vs actual net probe deflection during measurement of a circular feature by an analogue/scanning probe.
FIG. 2(b) illustrates the demanded axial position of the x and y axes over time for causing the table of the machine tool apparatus to move in a circle.

As illustrated in the graph of FIG. 2(*b*), to drive the table 14 in a circle can require commanding each of the x and y axes to move backward and forwards according to a sinusoidal motion, with the motion of the x and y axes being phase shifted by 90°. In FIG. 2(*b*), the demanded/commanded/instructed position of the table along the x-axis over time is illustrated by the dotted line 34 and the demanded/commanded/instructed position of the table along the y-axis over time is illustrated by the dash and double-dotted line 36.

To help illustrate the invention, it will be assumed that the workpiece 16 is a perfect cylinder, and it will be assumed that the table 14 and the workpiece 16 are moved along the x and y axes in accordance with instructions which are intended to drive the table 14 in a perfectly circular motion centred on the middle of the cylindrical workpiece 16. In such a scenario, it would be expected that the radial/total deflection of the probe will be constant at all positions around the target scan line 19 on the workpiece 16. This constant deflection is schematically illustrated by the dashed straight line 30 in the graph of FIG. 2(*a*), where the "D" represents the deflection of the probe and θ represents position about the circular feature.

However, it has been found that in such a scenario the deflection of the probe's stylus 24 tends to vary as the table is moved so that the probe measures the circular surface of the workpiece 16; as is schematically illustrated by the solid jagged line 32 in the graph of FIG. 2(*a*). As illustrated in FIGS. 2(*a*) and (*b*), such variation in the probe deflection has been found to coincide with the position/time at which a linear axis which is driving the workpiece 16 reverses direction. This can at least partially be caused by motor backlash, for instance.

In particular, when the motor of an axis is reversed (e.g. the motor for the x axis), there is a small delay before the motor actually begins to move the axis it is configured to drive because of "slack" or "play" in the motor. However, as is clearly illustrated in FIG. 2, at the point that the motor for one of the axes reverses (e.g. the motor 13 for the x axis in this example), the motor for the other axis (i.e. in this example the motor 15 for they axis) is still driving the other axis in a constant direction (and at a substantially constant, peak velocity). Accordingly, because of the combined effect of: i) the delay before the one axis actually begins to move after reversal, and ii) the other axis is still moving, the extent of deflection of the stylus 24 of the probe will vary as the probe moves around the target scan line 19.

Figure 3:
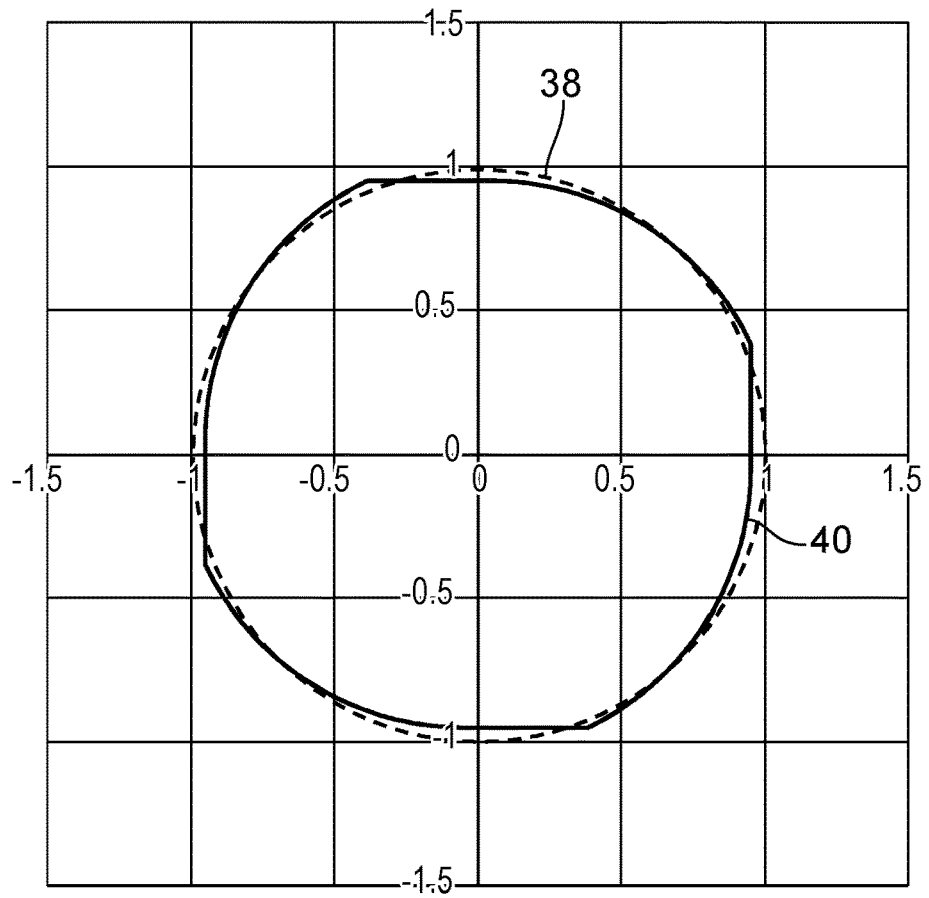
FIG. 3 illustrates the effect of axis reversal error on the data set obtained for a circular feature.

FIG. 3 schematically illustrates the effect of this variation in probe deflection on the determined form of the circular feature, taken in an anti-clockwise direction. In FIG. 3, the dashed line 38 illustrates the actual circular shape of the feature, and the solid line illustrates the misshapen-circular feature that will be determined if the probe's outputs are combined with the assumed position of the axes, or with the position information determined from the motor's encoders.

Axis reversal errors can be difficult to calibrate out because they can variable. For example, the axis reversal error for each axis can be different dependent on location and also can be affected by environmental factors such as temperature. Nevertheless, the method of the present invention (an example of which is described in more detail below) will reduce the effect of axis reversal error regardless of location and environmental factors.

The illustrations used herein assume a perfectly circular feature. Nevertheless, as will be understood, in practice a curved feature of a production part has an unknown (e.g. uncalibrated) shape/form. Accordingly, for example, a feature which is meant to be cylindrical/circular is unlikely to have a perfectly circular shape due to inaccuracies in the manufacturing process, and therefore the axis reversal errors can be hard to spot. Nevertheless, the method of the present invention (an example of which is described in more detail below) will inherently reduce the effect of axis reversal error without requiring identification of it. Also, the illustrations used herein significantly exaggerate the error that is likely to be experienced in real-life (and are not representative of the scale of the problem that would normally be expected from a typical machine tool apparatus). The actual errors in measurements caused by axis reversal experienced in real-life are likely to be so small (in the order of a few microns) that they will not be visible to the eye and are mixed in with the other sources of error. Nevertheless, the inventors have identified that errors caused by axis reversal and other sources of "lost motion" can have a significant impact on the form measurement of a curved feature.

Figure 4:
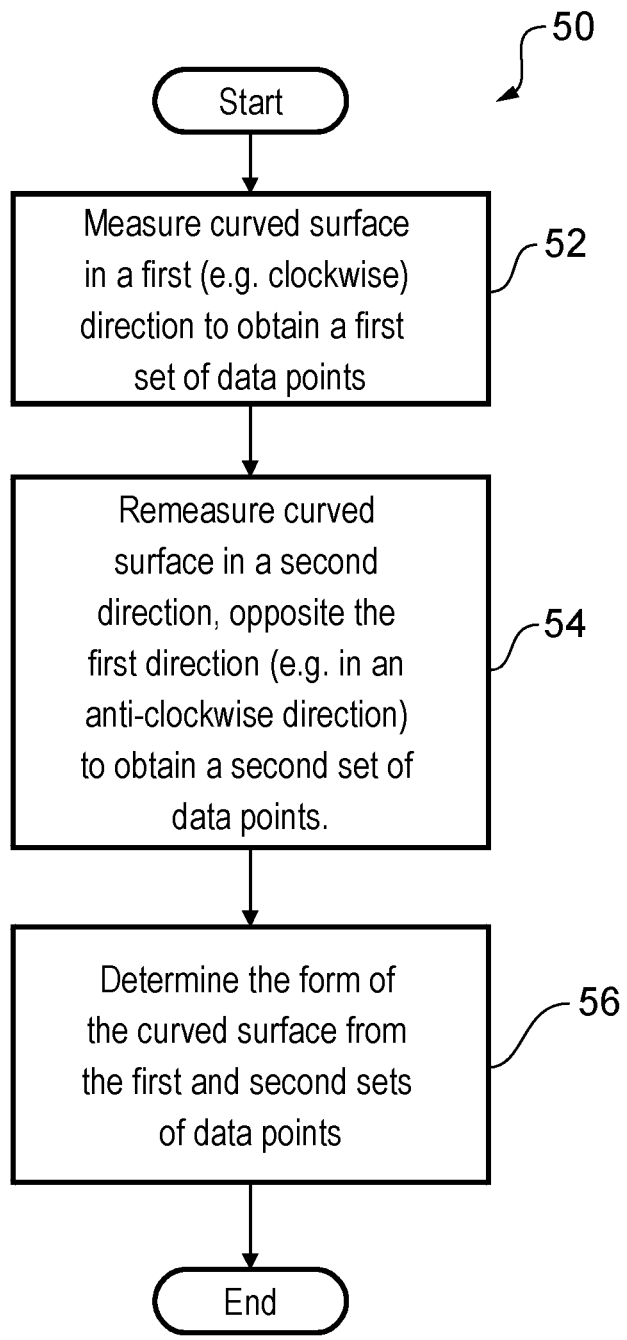
FIG. 4 shows a flow-chart for a process according to an example embodiment of the invention.

FIG. 4 illustrates an example process 50 for improving the accuracy of a form measurement of a curved surface in accordance with the present invention (in particular, for improving the accuracy of a form measurement of curved face of the workpiece 16). The method comprises, at step 52, controlling the machine tool apparatus 2 to cause the probe 20 to measure around the cylindrical surface of the workpiece 16 in a first direction along a curved path; in this embodiment along the circular target scan line 19. For example, in keeping with the above described embodiment, the method can comprise controlling the x and y axes to move the table 14 in a circular motion, such that the probe 20 measures the cylindrical surface along the circular target scan line 19 in a clockwise direction. As will be understood, each measurement taken along the circular target scan line is obtained substantially radially with respect to the circular target scan line.

The method then comprises, at step 54, controlling the machine tool apparatus 2 to cause the probe 20 to perform a second measurement around the cylindrical surface of the workpiece 16 along the same circular target scan line 19, but in this case the x and y axes are controlled so as to cause the table 14 and workpiece 15 to move in the opposite direction along the circular target scan line 19, such that the probe 20 measures the cylindrical surface along the circular target scan line 19 in an anti-clockwise direction. Again, each measurement taken along the circular target scan line is obtained substantially radially with respect to the circular target scan line.

In the described embodiment, the artefact and the measurement device are moved relative to each other by the positioning apparatus along the same curved path, such that same target scan line is measured for both the clockwise and anticlockwise directions, and such that the location of the target scan line within the machine tool apparatus's operating volume is the same for both the clockwise and anti-clockwise directions. Furthermore, in the described embodiment, the relative orientational configuration of the measurement device and artefact are the same for the both the clockwise and anticlockwise scans/measurement operations (e.g. the workpiece has not been rotated between the clockwise and anticlockwise scans/measurement operations measurements).

The method then comprises, at step 56, using data obtained from the first and second measurements to determine the form, in particular the circularity, of the cylindrical surface of the workpiece 16. Step 56 can be performed by a process running on the PC 8, but as will be understood, this need not necessarily be the case. For instance, the measurement data could be transferred to another processor device (not shown) and step 56 could be performed by that other processor device. How the data from the first and second measurements are used to determine the circularity is explained in more detail below.

Figure 5:
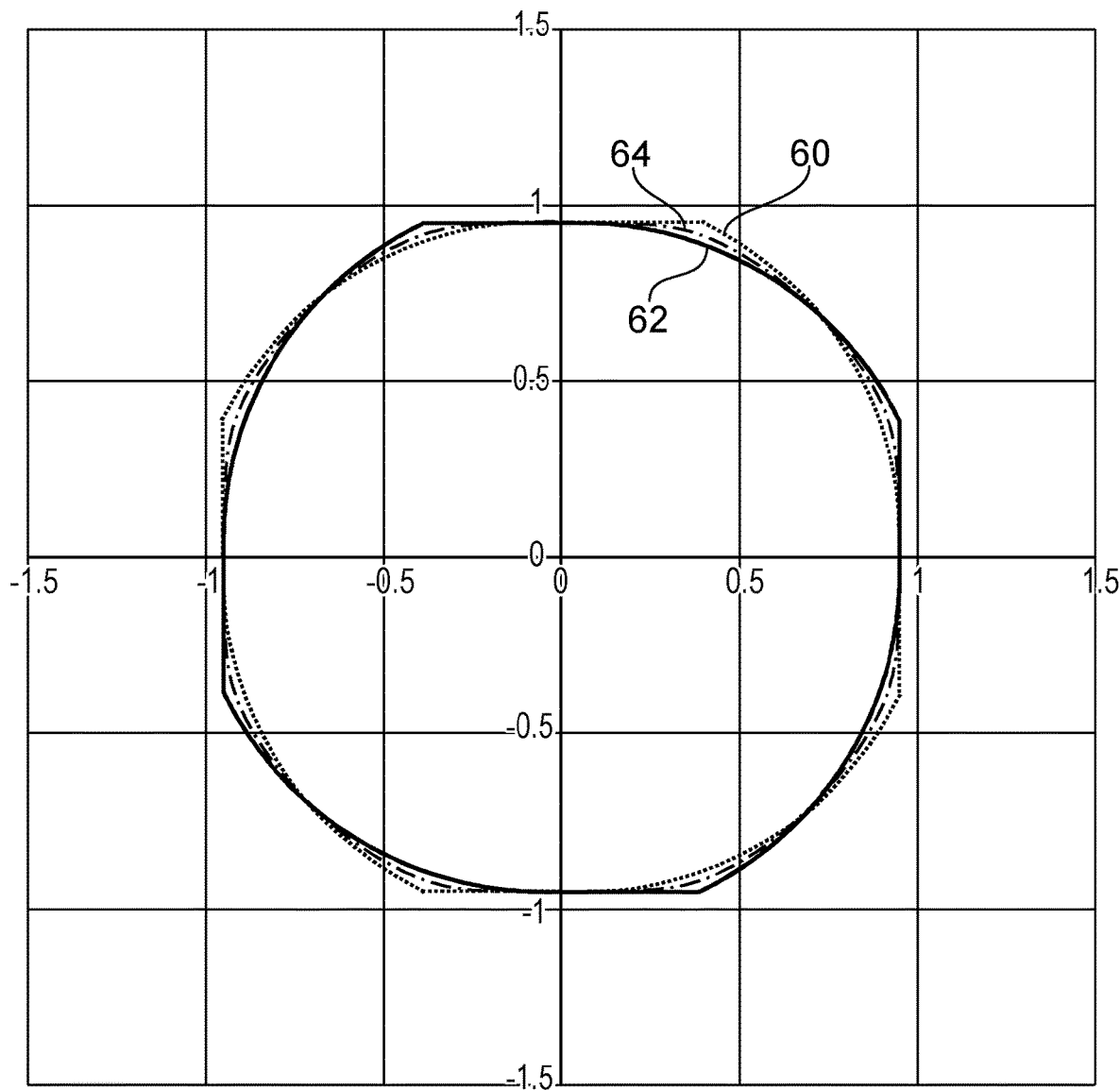
FIG. 5 is a graph comprising lines representing data sets obtained of a circular feature taken in opposite (e.g. clockwise and anticlockwise) directions.

The graph of FIG. 5 shows a first line 60 representing a first set of data points obtained along the target scan line 19 of the inner cylindrical surface of the workpiece 16, taken with the table moving in a clockwise direction. FIG. 5 also shows a second line 62 representing a second set of data points obtained along the same target scan line 19 on the cylindrical surface of the workpiece 16 as the first measurement, but taken with the table 14 moving in an anticlockwise direction. As shown, each of these sets of data points contain the effects of the axis reversal error and result in a misshapen representation of the cylindrical surface of the workpiece 16.

In accordance with one embodiment of the present invention, the data points obtained during the clockwise and anti-clockwise motions are used to obtain a third set of data points which lie on a surface intermediate between the surfaces represented by the first and second data sets, and the circularity can then be determined from the third set of data points. For example, ($x1_n$, $y1_n$)=clockwise data points
($x2_n$, $y2_n$)=anti-clockwise data points
($x_n$, $y_n$)=third set data points on intermediate surface Referring to FIG. 6, as illustrated, there might not be a 1:1 correspondence between the clockwise 60 and anti-clockwise 62 data points. According to one example embodiment, the ($x_n$, $y_n$) data points could be calculated as follows. For each point ($x1_n$, y1n) in the one of the data sets (e.g. the anti-clockwise data set), choose the point ($x2_m$, $y2_m$) from the other data set (e.g. the clockwise data set) which is closest to subtending the same angle, θ. Then obtain the $(x_n, y_n)$ data points as follows:

$$(x_n, y_n) = \frac{(x1_n, y1_n) + (x2_m, y2_m)}{2}$$

Figure 6:
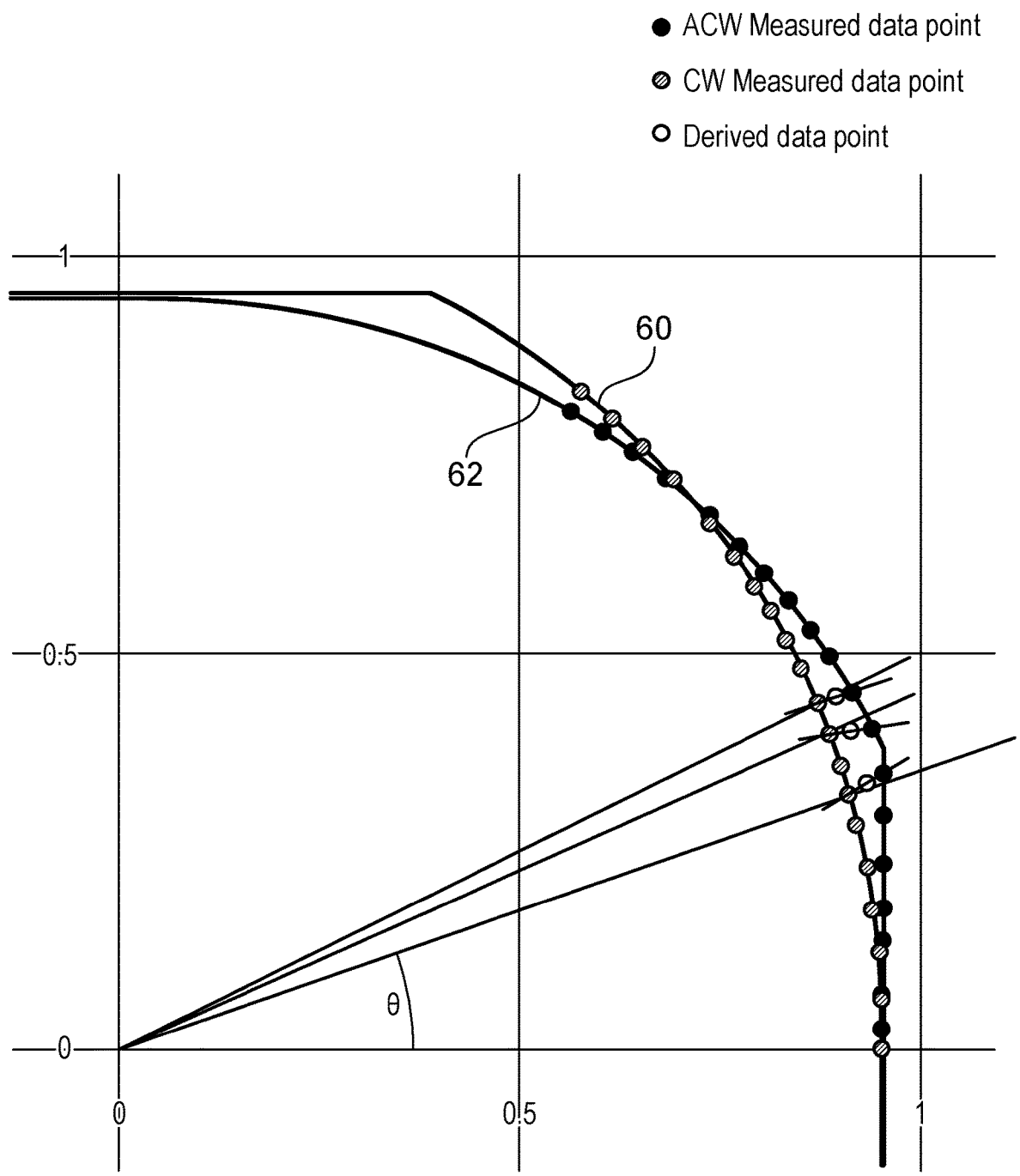
FIG. 6 illustrates a close-up view of a section of the graph of FIG. 5.

FIG. 6 shows three example derived data points. Circularity could then be calculated using $(x_n, y_n)$ over all n. The slight difference in angle between $(x1_n, y1_n)$ and $(x2_m, y2_m)$ will not substantially affect the form/circularity value because the $(x_n, y_n)$ point still lies on the desired surface. The above described processes finds a derived data point for each and every measurement data point in one of the measured data sets (e.g. the anti-clockwise data set), However, this need not necessarily be the case. For example, the method can comprise deriving a derived data point for a subset of points in one of the measured data sets (e.g. the anti-clockwise data set); for example, for every-other point in one of the measured data sets.

Referring back to FIG. 5, there is shown a dot-and-dash line 64 which represents an intermediate surface representative of the third set of data points, and which is equidistant from the surfaces/lines 60, 62 representative of the first and second data sets. As can be seen, the intermediate line 64 is more circular than the first 60 and second 62 lines. Accordingly, a form/circularity measurement determined from the third set of data points will provide a more representative circularity measurement of the cylindrical surface of the workpiece 16 than a form/circularity measurement determined from either of the first and second data sets.

The above described process involves determining a third set of data points, but as will be understood this need not necessarily be the case. For instance, the method could comprise fitting a curve such that it is equi-distant between the first and second sets of data points. In an example embodiment, curves could be put through each of the first and second sets of data points, and then a third curve can be fitted such that it is equi-distant between the first and second curves.

The invention claimed is:

1. A method of determining a form measurement for a curved feature of an artefact, the method comprising:
   i) a machine tool relatively moving the artefact and a measurement device along a first predefined curved path in a first direction, to obtain a first set of data points along the surface of the curved feature;
   ii) the machine tool relatively moving the artefact and the measurement device along a second predefined curved path in a second direction, opposite to the first direction, to obtain a second set of data points along the surface of the curved feature; and
   iii) using the first and second sets of data points to determine a form measurement for the artefact,
   wherein relative movement along the first predefined curved path in the first direction and the second predefined curved path in the second direction is effected by motion of at least one linear movement axis of the machine tool, which is reversed during the movement along the first predefined curved path in the first direction and the second predefined curved path in the second direction.

2. The method as claimed in claim 1, in which using the first and second sets of data points comprises obtaining therefrom a representation of an intermediate surface which lies between surfaces represented by the first and second sets of data points, and determining the form measurement from the representation of the intermediate surface.

3. The method as claimed in claim 2, in which the intermediate surface is equidistant between lines represented by the first and second sets of data points.

4. The method as claimed in claim 2, in which said representation of an intermediate surface comprises a third set of data points.

5. The method as claimed in claim 1, in which the first set of data points and the second set of data points comprise measurement data obtained radially with respect to curvature of the first predefined curved path and the second predefined curved path at respective points of measurement.

6. The method as claimed in claim 1, in which the first and second sets of data points are obtained with the same relative angular orientation of the measurement device and artefact.

7. The method as claimed in claim 1, in which the first and second sets of data points are obtained along the same target scan line on the surface of the curved feature.

8. The method as claimed in claim 1, in which the curved path along which the artefact and measurement device are relatively moved to obtain the second set of data points is the same curved path along which the artefact and measurement device are relatively moved to obtain the first set of data points.

9. The method as claimed in claim 1, in which the machine tool comprises a machine tool on which the artefact was previously machined, or on which the artefact is to be machined.

10. The method as claimed in claim 1, in which the curved feature comprises an arc-shaped feature.

11. The method as claimed in claim 1, in which the curved feature comprises a circular feature.

12. The method as claimed in claim 1, in which the form measurement comprises a circularity measurement.

13. The method as claimed in claim 1, in which the measurement device comprises a contact scanning probe and in which the first and second data sets are obtained by scanning the scanning probe in continuous contact along the surface of the curved feature.

14. The method as claimed in claim 2, in which the representation of the intermediate surface comprises a curve.

15. A computer implemented method, comprising:
   taking a first set of data points which were obtained by a measurement device mounted on a machine tool whilst the measurement device and an artefact were moved by the machine tool relative to each other along a first predetermined curved path in a first direction,
   taking a second set of data points which were obtained by the measurement device whilst the measurement device and the artefact were moved by the machine tool relative to each other along a second predefined curved path in a second direction, and
   using the first and second data sets to determine a form measurement for the artefact,
   wherein relative movement along a first predefined curved path in the first direction and the second predefined curved path in the second direction is effected by motion of at least one linear movement axis of the machine tool, which is reversed during the movement along the first predefined curved path in the first direction and the second predefined curved path in the second direction.

16. A non-transitory computer readable medium comprising computer program code configured to cause an apparatus to perform the method of claim 15.

17. A processing device which is configured to take a first set of data points which were obtained by a measurement device mounted on a machine tool whilst the measurement device and an artefact were moved by the machine tool relative to each other along a first predefined curved path in a first direction, and to take a second of data points which were obtained by the measurement device whilst the measurement device and the artefact were moved by the machine tool relative to each other along a second predefined curved path in a second direction, and to use the first and second data sets to determine a form measurement for the artefact, wherein relative movement along the first predefined curved path in the first direction and the second predefined curved path in the second direction is effected by motion of at least one linear movement axis of the machine tool, which is reversed during the movement along the first predefined curved path in the first direction and the second predefined curved path in the second direction.

18. An apparatus comprising
a machine tool on which a measurement device and artefact are located, wherein the apparatus is configured to
i) cause the machine tool to relatively move the artefact and a measurement device relative along a first predefined curved path in a first direction, to obtain a first set of data points along the surface of the curved feature,
ii) cause the machine tool to relatively move the artefact and the measurement device other along a second predefined curved path in a second direction, opposite to the first direction, to obtain a second set of data points along the surface of the curved feature, and
iii) use the first and second sets of data points to determine a form measurement for the artefact, wherein relative movement along the first predefined curved path in the first direction and the second predefined curved path in the second direction is effected by motion of at least one linear movement axis of the machine tool, which is reversed during the movement along the first predefined curved path in the first direction and the second predefined curved path in the second direction.

19. The method as claimed in claim 1, in which
i) the machine tool relatively moving the artefact and the measurement device along the first predefined curved path in the first direction, and
ii) the machine tool relatively moving the artefact and the measurement device along the second predefined curved path in the second direction
is effected by combined motion of at least two, non-parallel, linear movement axes of the machine tool, at least one of which is reversed during the movement in each of the first and second directions.

20. The apparatus as claimed in claim 18, wherein the apparatus is configured to cause
i) the machine tool relatively moving the artefact and the measurement device along the first predefined curved path in the first direction, and
ii) the machine tool relatively moving the artefact and the measurement device along the second predefined curved path in the second direction
by combined motion of at least two, non-parallel, linear movement axes of the machine tool, at least one of which is reversed during the movement in each of the first and second directions.

* * * * *